(12) United States Patent
Uchida et al.

(10) Patent No.: US 11,674,480 B2
(45) Date of Patent: Jun. 13, 2023

(54) HEAT EXCHANGE DEVICE

(71) Applicant: NISSAN MOTOR CO., LTD., Yokohama (JP)

(72) Inventors: Ryo Uchida, Kanagawa (JP); Takayuki Hamamoto, Kanagawa (JP); Yuta Kanashima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/620,825

(22) PCT Filed: Jun. 21, 2019

(86) PCT No.: PCT/IB2019/000637
§ 371 (c)(1),
(2) Date: Dec. 20, 2021

(87) PCT Pub. No.: WO2020/254847
PCT Pub. Date: Dec. 24, 2020

(65) Prior Publication Data
US 2022/0412294 A1    Dec. 29, 2022

(51) Int. Cl.
| | | |
|---|---|---|
| *F02M 31/20* | (2006.01) | |
| *F02M 29/04* | (2006.01) | |
| *F02M 31/04* | (2006.01) | |
| *F02M 35/10* | (2006.01) | |
| *F02B 29/04* | (2006.01) | |

(52) U.S. Cl.
CPC ........... *F02M 31/042* (2013.01); *F02B 29/04* (2013.01); *F02M 31/20* (2013.01); *F02M 35/10268* (2013.01)

(58) Field of Classification Search
CPC .......... F02M 31/042; F02M 35/10268; F02M 31/00; F02M 31/02; F02M 31/04; F02M 31/20; F02B 29/04; F02B 29/0406; F02B 29/0437; F02B 29/0462
See application file for complete search history.

(56) References Cited

U.S. PATENT DOCUMENTS

2012/0018127 A1\* 1/2012 Iwasaki ................. F02M 26/32
165/104.14
2013/0180507 A1    7/2013 Nakasugi et al.
(Continued)

FOREIGN PATENT DOCUMENTS

DE    10 2007 030 464 A1    1/2009
JP         59-035674 U        3/1984
(Continued)

*Primary Examiner* — Jacob M Amick
(74) *Attorney, Agent, or Firm* — Foley & Lardner LLP

(57) ABSTRACT

The intake air cooling device 100A constitutes a heat exchange device that performs heat exchange of the intake air of the internal combustion engine 6. The intake air cooling device 100A includes the heat exchange part 1A configured to perform heat exchange between the cooling liquid W that is introduced thereto and the intake air that is passing therethrough, and the intake air control valve 2 configured to perform control of the intake air that passes through the heat exchange part 1A. The cooling liquid introduction port 13 of the heat exchange part 1A and the intake air control valve 2 are provided at positions opposing each other with respect to the heat exchange part 1A.

8 Claims, 7 Drawing Sheets

(56) References Cited

U.S. PATENT DOCUMENTS

| | | |
|---|---|---|
| 2016/0003128 A1 | 1/2016 | Berger et al. |
| 2016/0326948 A1* | 11/2016 | Takano ............... F02B 29/0475 |
| 2018/0023524 A1 | 1/2018 | Rikitake et al. |
| 2019/0162110 A1 | 5/2019 | Manju |

FOREIGN PATENT DOCUMENTS

| | | |
|---|---|---|
| JP | 2009-203966 | 9/2009 |
| JP | 2012-036805 A | 2/2012 |
| JP | 2012-102667 A | 5/2012 |
| JP | 2013-147952 A | 8/2013 |
| JP | 2014-051907 A | 3/2014 |
| JP | 2016-211435 A | 12/2016 |
| JP | 2018-013061 | 1/2018 |
| JP | 2019-094856 A | 6/2019 |
| WO | WO-2010/110111 A1 | 9/2010 |

* cited by examiner

| | INTAKE STROKE OF CYLINDER #1 | INTAKE STROKE OF CYLINDER #2 | INTAKE STROKE OF CYLINDER #3 |
|---|---|---|---|
| CROSS-SECTION I–I | ONE END SIDE ← → OTHER END SIDE | ONE END SIDE ← → OTHER END SIDE | ONE END SIDE ← → OTHER END SIDE |
| CROSS-SECTION II–II | ONE END SIDE ↑ #1 #2 #3 ↓ OTHER END SIDE | ONE END SIDE ↑ #1 #2 #3 ↓ OTHER END SIDE | ONE END SIDE ↑ #1 #2 #3 ↓ OTHER END SIDE |

HEAT EXCHANGE DEVICE

TECHNICAL FIELD

The present invention relates to a heat exchange device that performs heat exchange of intake air of an internal combustion engine.

BACKGROUND ART

JP2012-102667A discloses an intake air cooling device in which a cooling water circulation circuit that introduces cooing water to a water-cooled intercooler is connected from the same side as an air intake pipe.

SUMMARY OF INVENTION

In a heat exchange device that performs heat exchange of intake air, intake air that is introduced into a heat exchange part may drift due to curves in the air intake system. In this case, the heat exchange is carried out in a state in which the intake air has drifted, and thus the heat of the intake air may not be able to be efficiently exchanged.

The present invention was created in consideration of such a problem, and an object of the present invention is to efficiently perform heat exchange of intake air.

A heat exchange device according to one aspect of the present invention is a heat exchange device for performing heat exchange of intake air of an internal combustion engine. The heat exchange device includes a heat exchange part configured to exchange heat between a heat medium introduced into the heat exchange part and intake air passing through the heat exchange part and an intake air control valve configured to perform control of the intake air passing through the heat exchange part. A heat medium introduction port of the heat exchange part and the intake air control valve are provided at positions opposing each other with respect to the heat exchange part.

Due to this configuration, the intake air is made to flow toward a direction opposite the direction in which the cooling liquid is introduced, and the intake air flowing in this manner flows into the heat exchange part. Accordingly, the cooling liquid can be introduced to an area where the intake air flow rate is high in the heat exchange part. Therefore, a large temperature difference between the intake air and the cooling liquid can be created in this area, and the heat of the intake air can be efficiently exchanged so as to cool the intake air.

DESCRIPTION OF EMBODIMENTS

In the following, embodiments of the present invention will be explained while referring to the attached drawings.

First Embodiment

Figure 1:
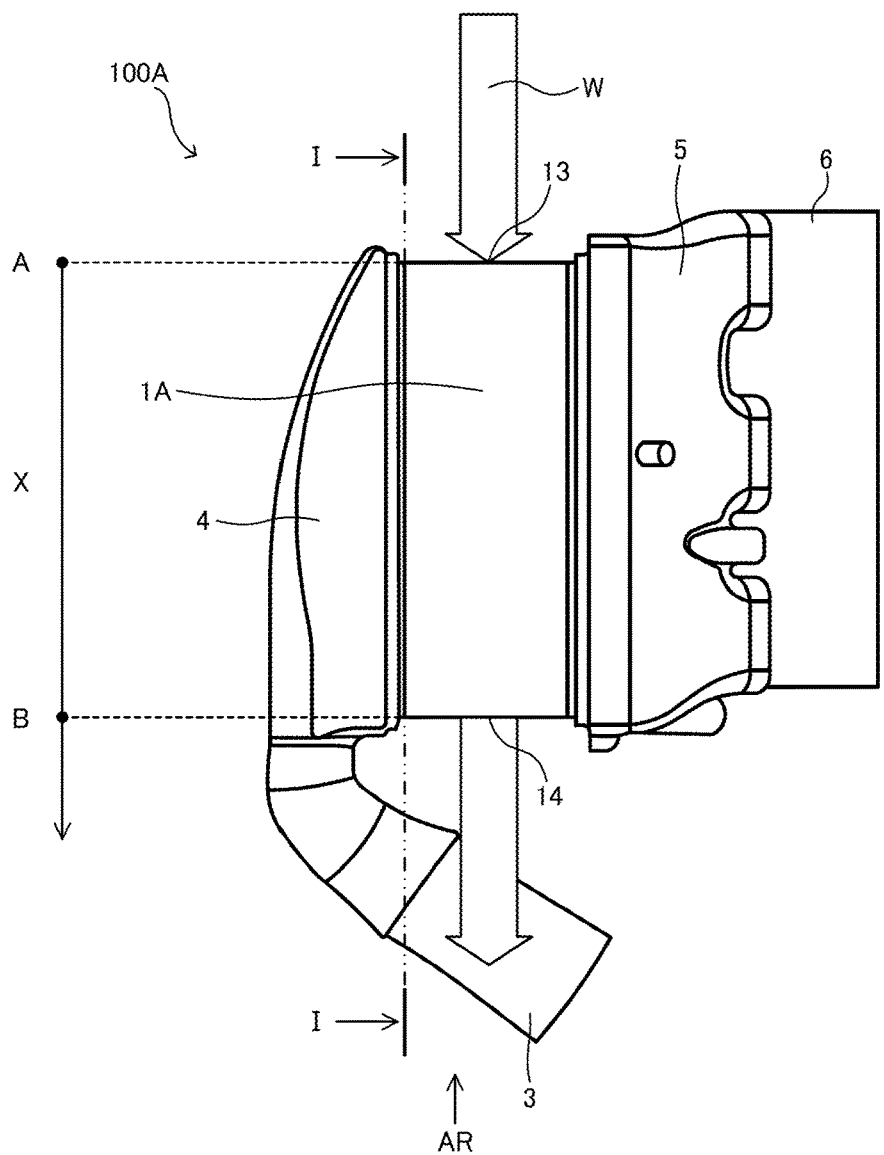
FIG. 1 is a schematic configurational view of an intake air cooling device of an internal combustion engine.
Figure 2:
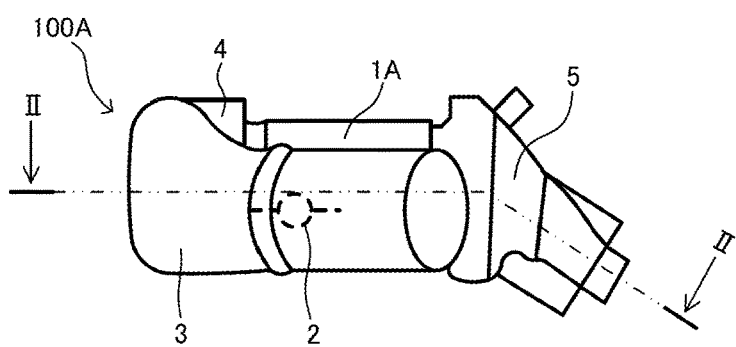
FIG. 2 illustrates the intake air cooling device of the internal combustion engine when viewed along the arrow AR shown in FIG. 1.
Figures 3, 4:
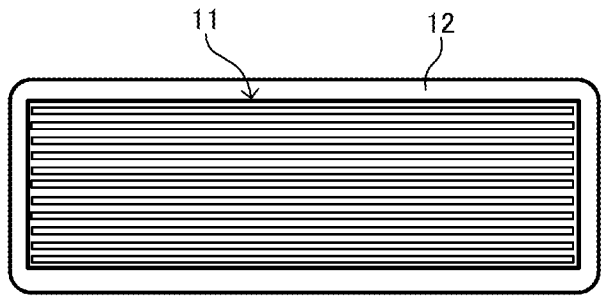
FIG. 3 illustrates a heat exchange part when viewed along the cross-section I-I shown in FIG. 1.
FIG. 4 illustrates a drift state of intake air.

FIG. 1 is a schematic configurational view of an intake air cooling device 100A of an internal combustion engine (hereinafter simply referred to as the intake air cooling device). FIG. 2 illustrates the intake air cooling device 100A when viewed along the arrow AR shown in FIG. 1. FIG. 3 illustrates a heat exchange part 1A when viewed along the cross-section I-I shown in FIG. 1. A distance X, a point A, and a point B shown in FIG. 1 shall be explained below.

The intake air cooling device 100A is provided to an internal combustion engine 6, and cools intake air of the internal combustion engine 6. The internal combustion engine 6 is configured as a spark ignition internal combustion engine with a supercharger, and in the present embodiment, the internal combustion engine 6 is an inline three-cylinder gasoline engine. The intake air cooling device 100A includes a heat exchange part 1A, an intake air control valve 2, an air intake pipe 3, a collector 4, and an intake manifold 5. The intake air cooling device 100A corresponds to a heat exchange device.

The heat exchange part 1A exchanges heat between a cooling liquid W that is introduced into the heat exchange part 1A and intake air that passes through the heat exchange part 1A. The cooling liquid W is a heat medium, and is used in a liquid phase state. In other words, the heat exchange part 1A constitutes a water-cooled heat exchange part when cooling the intake air. The cooling liquid W also includes, for example, a coolant in the case that a cooling liquid circuit is not configured to have the internal combustion engine 6, and thus a coolant of the internal combustion engine 6 can be used as the cooling liquid W.

The heat exchange part 1A includes a heat exchanger 11 and a case 12. The heat exchanger 11 allows the cooling liquid W to flow therein, and exchanges heat between the cooling liquid W and the intake air. The case 12 accommodates the heat exchanger 11, and constitutes an intake air passage which allows intake air to pass through the heat exchanger 11.

The heat exchanger 11 is an intercooler, and is incorporated in a cooling liquid circuit that radiates heat by means of a heat radiation part such as a radiator. The cooling liquid circuit is configured to cause the cooling liquid W to receive heat by means of the heat exchanger 11, and is configured so as not to include a heat source for causing the cooling liquid W to receive heat. The heat source is, for example, the internal combustion engine 6. The heat source may also be a motor or the like. The heat exchange part 1A includes the heat exchanger 11 that is incorporated into the cooling liquid circuit, and thus constitutes a portion of the cooling liquid circuit. The cooling liquid circuit corresponds to a heat medium circuit.

The heat exchange part 1A is provided with a cooling liquid introduction port 13 and a cooling liquid outlet 14. The cooling liquid introduction port 13 and the cooling liquid outlet 14 are provided at positions opposing each other with respect to the heat exchange part 1A. The cooling liquid introduction port 13 is provided at one end side in the lengthwise direction (up-down direction in FIG. 1) of the heat exchange part 1A. Therefore, the cooling liquid W flows through the heat exchange part 1A in the lengthwise direction. The lengthwise direction of the heat exchange part 1A corresponds to the direction in which the cylinders are arranged in the internal combustion engine 6. The cooling liquid introduction port 13 corresponds to a heat medium introduction port, and the cooling liquid outlet 14 corresponds to a heat medium outlet.

The intake air control valve 2 performs control of intake air that passes through the heat exchange part 1A. The intake air control valve 2 is disposed on the upstream side of the air intake system from the heat exchange part 1A. The intake air control valve 2 is provided within the air intake pipe 3, and controls the flow rate of intake air that flows therethrough by changing the degree of opening of the passage within the air intake pipe 3. The intake air control valve 2 is provided at a position opposing the cooling liquid introduction port 13 with respect to the heat exchange part 1A. By providing the intake air control valve 2 in this way, the intake air control valve 2 is provided at the other end side in the lengthwise direction of the heat exchange part 1A.

The air intake pipe 3 is connected to the heat exchange part 1A via the collector 4. Therefore, intake air flows into the heat exchange part 1A via the collector 4. The air intake pipe 3 is connected to the collector 4 at an orientation opposing the direction in which the cooling liquid is introduced from the cooling liquid introduction port 13. Therefore, the air intake pipe 3 causes the intake air to flow toward a direction opposite the direction in which the cooling liquid is introduced from the cooling liquid introduction port 13.

The collector 4 temporarily stores the intake air. The collector 4 has a lengthwise direction in the direction in which the cylinders are arranged similar to the heat exchange part 1A, and is connected to the case 12 of the heat exchange part 1A. The collector 4 causes the intake air, which has flowed in toward the direction opposite the direction in which the cooling liquid is introduced from the cooling liquid introduction port 13, to flow into the heat exchange part 1A. The collector 4 corresponds to a collector part.

The collector 4 may be configured integrally with the heat exchange part 1A. In this case, the portion of the integrated case on the upstream side of the air intake system from the heat exchanger 11 may be understood as the collector part. Further, the portion of the integrated case that accommodates the heat exchanger 11 and the heat exchanger 11 itself may be understood as the heat exchange part 1A.

Intake air that has flowed through the heat exchange part 1A flows into the intake manifold 5. The intake manifold 5 distributes the intake air into the cylinders of the internal combustion engine 6.

Incidentally, the collector 4 is intended to equalize the intake air flowing into the cylinders of the internal combustion engine 6. However, the intake air that is introduced into the heat exchange part 1A may drift as explained below due to the curvature of the air intake pipe 3.

FIG. 4 illustrates a drift state of the intake air. The row entitled "cross-section I-I" illustrates the drift state of the intake air when viewed along the cross-section I-I shown in FIG. 1, and the darker portions indicate where the intake air flow speed is higher. The row entitled "cross-section II-II" illustrates the drift state of the intake air when viewed along the cross-section II-II shown in FIG. 2.

As shown in FIG. 4, the intake air drifts as follows in conjunction with its separation at the inside portion of the curvature of the air intake pipe 3. As shown by the dashed-line circles on the cross-sections I-I, the intake air drifts in a region from the center to one end side in the lengthwise direction of the heat exchange part 1A in the intake stroke of a cylinder #1, the intake stroke of a cylinder #2, and the intake stroke of a cylinder #3. In this case, heat exchange is carried out in a state in which the intake air has drifted, and thus the heat of the intake air may not be able to be efficiently exchanged if such intake air drift has not been particularly considered.

Considering the above circumstances, in the intake air cooling device 100A, the intake air control valve 2 is provided at a position opposing the cooling liquid introduction port 13 with respect to the heat exchange part 1A. As a result, the following various characteristics are achieved in the heat exchange part 1A.

Figure 5:
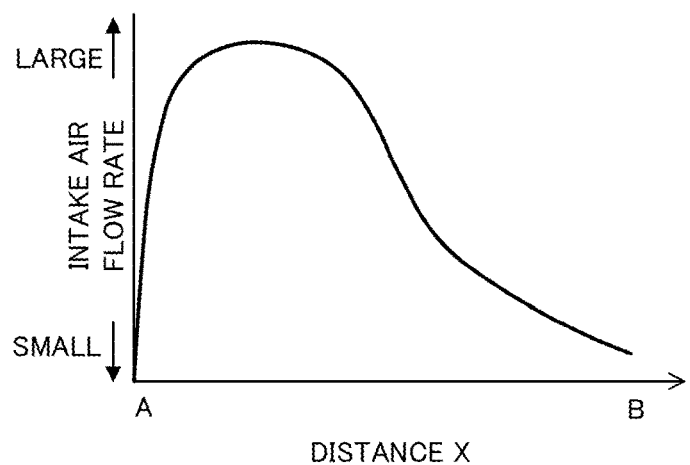
FIG. 5 illustrates intake air flow rate characteristics of a heat exchanger.
Figure 6:
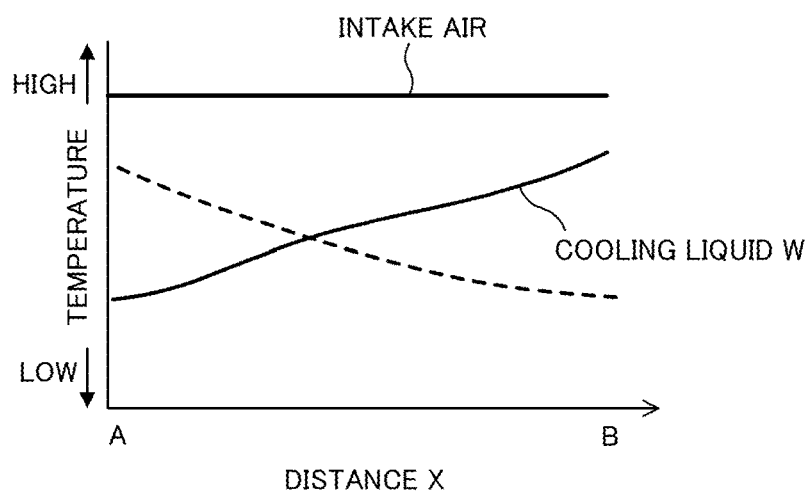
FIG. 6 illustrates temperature characteristics of the heat exchanger.
Figure 7:
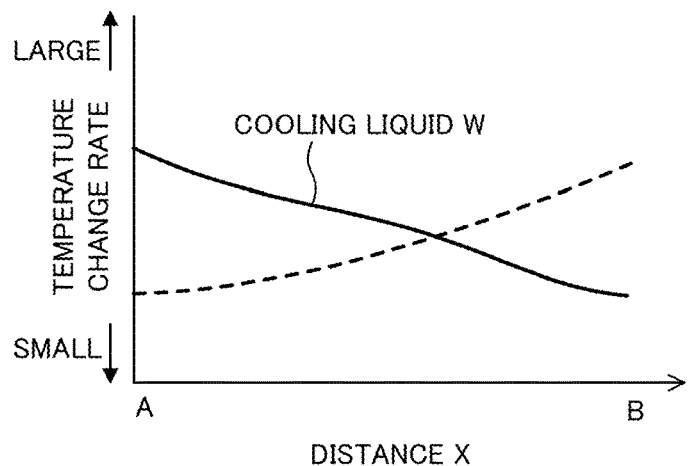
FIG. 7 illustrates temperature change rate characteristics of the heat exchanger.
Figure 8:
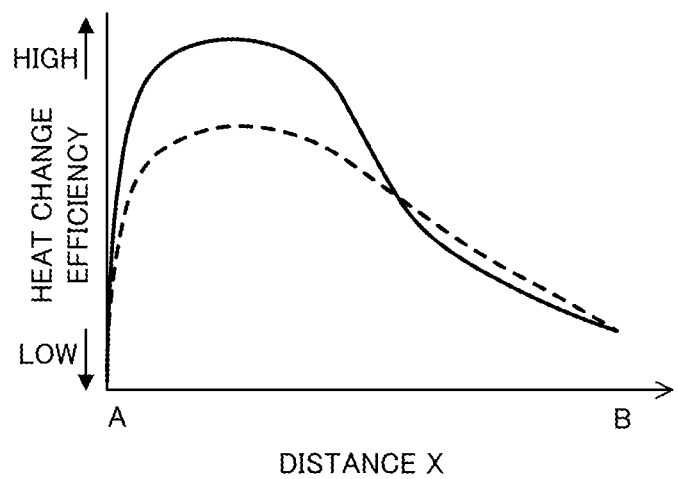
FIG. 8 illustrates heat exchange efficiency characteristics of the heat exchanger.

FIGS. 5 to 8 illustrate various characteristics of the heat exchange part 1A. In FIGS. 5 to 8, various parameters are indicated on the vertical axis, and a distance X indicated in FIG. 1 is shown on the horizontal axis. The distance X is the distance in the lengthwise direction of the heat exchange part 1A, and indicates the distance from the point A. The point A side corresponds to the one end side in the lengthwise direction of the heat exchange part 1A, and the point B side corresponds to the other end side in the lengthwise direction of the heat exchange part 1A. In FIGS. 6 to 8, a comparative example is also indicated using a dashed line. The comparative example indicates a case in which the cooling liquid introduction port 13 and the intake air control valve 2 are both provided on the point B side with respect to the heat exchange part 1A. In the comparative example, the cooling liquid outlet 14 is provided on the point A side.

As shown in FIG. 5, the intake air flow rate is higher between the center of the distance X and the point A. This is because the intake air is drifting as explained above. The same tendency can be seen with regard to the intake air flow speed.

As shown in FIG. 6, the intake air temperature is constant regardless of the distance X. The temperature of the cooling liquid W is lower than the intake air temperature, and increases from the point A side toward the point B side. In other words, in the heat exchange part 1A, a temperature gradient (temperature change) is formed, exhibiting a trend in which the temperature of the cooling liquid W becomes gradually higher from the point A side toward the point B side. This is because heat exchange is being carried out while the cooling liquid W is flowing from the point A side toward the point B side. In the case of the comparative example, the cooling liquid W flows from the point B side toward the point A side, and thus the temperature of the cooling liquid W increases from the point B side toward the point A side.

As shown in FIG. 7, the temperature change rate of the cooling liquid W decreases from the point A side toward the point B side. This is because the temperature difference between the cooling liquid W and the intake air is greater toward the point A side, resulting in accelerated heat exchange. Therefore, in the case of the present embodiment, the heat exchange is more accelerated on the point A side where the intake air flow rate is higher due to drift. In the case of the comparative example, the temperature difference between the cooling liquid W and the intake air is greater on the point B side. Therefore, in the case of the comparative example, the temperature change rate of the cooling liquid W decreases from the point B side toward the point A side, and thus the heat exchange is more accelerated on the point B side where the intake air flow rate is lower.

Figure 9:
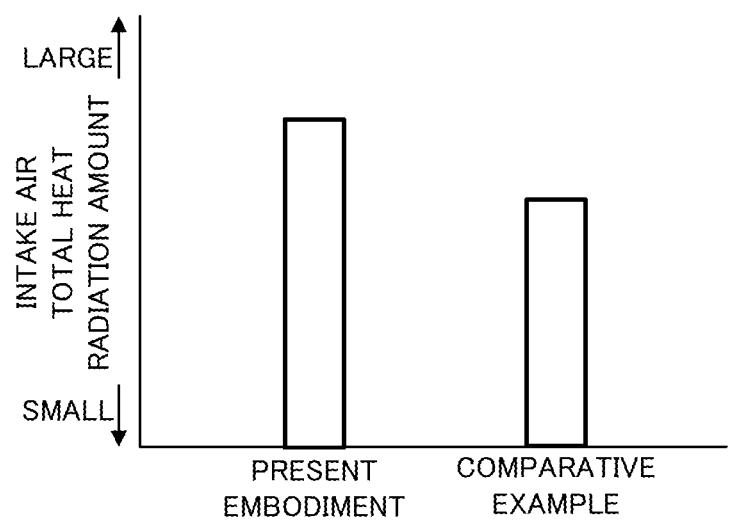
FIG. 9 illustrates an intake air total heat radiation amount in the heat exchanger.

As shown in FIG. 8, in the case of the present embodiment, the heat exchange efficiency is high from the center of the distance X to the point A. This is because the temperature difference between the cooling liquid W and the intake air is greater on the point A side where the intake air is drifting. In the case of the comparative example, the heat exchange efficiency is high from the center of the distance X to the point A, but it is lower than that of the present embodiment. This is because while the intake air drifts on the point A side, the temperature difference between the cooling liquid W and the intake air is small on the point A side. FIG. 9 illustrates an intake air total heat radiation amount in the heat exchange part 1A. Therein, it can be understood that the total heat radiation amount of the intake air is also greater in the present embodiment than in the comparative example.

Next, the main operational effects of the present embodiment shall be explained.

The intake air cooling device 100A constitutes a heat exchange device that performs heat exchange of the intake air of the internal combustion engine 6. The intake air cooling device 100A includes the heat exchange part 1A that performs heat exchange between the cooling liquid W that is introduced thereto and the intake air that is passing therethrough, and the intake air control valve 2 that performs control of the intake air that passes through the heat exchange part 1A. The cooling liquid introduction port 13 of the heat exchange part 1A and the intake air control valve 2 are provided at positions opposing each other with respect to the heat exchange part 1A.

Due to this configuration, the intake air is made to flow toward a direction opposite the direction in which the cooling liquid is introduced, and the intake air flowing in this manner flows into the heat exchange part 1A. Accordingly, the cooling liquid W can be introduced to an area where the intake air flow rate is high in the heat exchange part 1A. Therefore, a large temperature difference between the intake air and the cooling liquid W can be created in this area, and the heat of the intake air can be efficiently exchanged so as to cool the intake air.

In the present embodiment, the cooling liquid introduction port 13 and the cooling liquid outlet 14 are provided at positions opposing each other with respect to the heat exchange part 1A.

Due to this configuration, the flow of the cooling liquid W in the heat exchange part 1A can be made unidirectional, and thus a greater temperature difference between the intake air and the cooling liquid W can be created in the area where the intake air flow rate is high. Therefore, according to this configuration, the heat of the intake air can be more efficiently exchanged so as to cool the intake air compared to a case in which, for example, the cooling liquid outlet 14 is provided on the same side as the cooling liquid introduction port 13 with respect to the heat exchange part 1A.

In the present embodiment, the intake air flows into the heat exchange part 1A via the collector 4. The heat exchange part 1A and the collector 4 have a lengthwise direction in the direction in which the cylinders are arranged in the internal combustion engine 6. The cooling liquid introduction port 13 is provided at one end side in the lengthwise direction of the heat exchange part 1A. The intake air control valve 2 causes the intake air to flow into the collector 4 from the other end side in the lengthwise direction of the heat exchange part 1A.

Due to this configuration, a temperature gradient is formed in the heat exchange part 1A, the temperature gradient exhibiting a trend in which the temperature of the cooling liquid W becomes gradually higher from the one end side toward the other end side in the lengthwise direction of the heat exchange part 1A, and a large temperature difference can be created between the intake air that drifts to the one end side in the lengthwise direction and the cooling liquid W. Therefore, according to this configuration, the heat of the intake air can be efficiently exchanged so as to cool the intake air.

Figure 13:
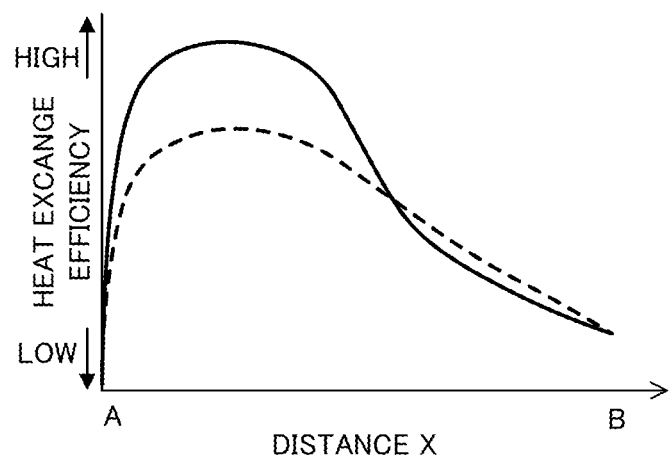
FIG. 13 illustrates the heat exchange efficiency characteristics of the alternative embodiment.
Figure 14:
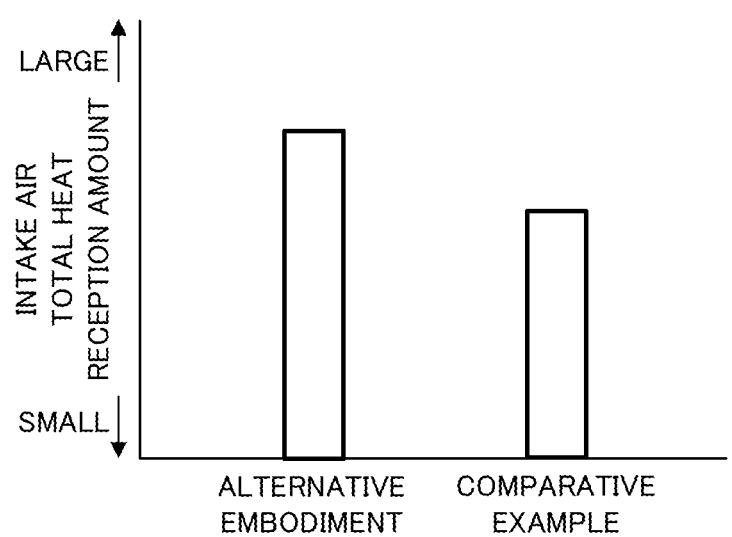
FIG. 14 illustrates the intake air total heat reception amount of the alternative embodiment.

The intake air cooling device 100A may also be used to heat the intake air. In this case, the cooling liquid circuit that causes the cooling liquid W to flow through the heat exchange part 1A can be configured so as to have a heat source. In such a case, the cooling liquid W can be made to receive heat from the heat source, and heat can be radiated from cooling liquid W in the heat exchange part 1A. The various characteristics of the heat exchange part 1A in this case are shown in FIGS. 10 to 13, and the intake air total heat reception amount is shown in FIG. 14.

Figure 10:
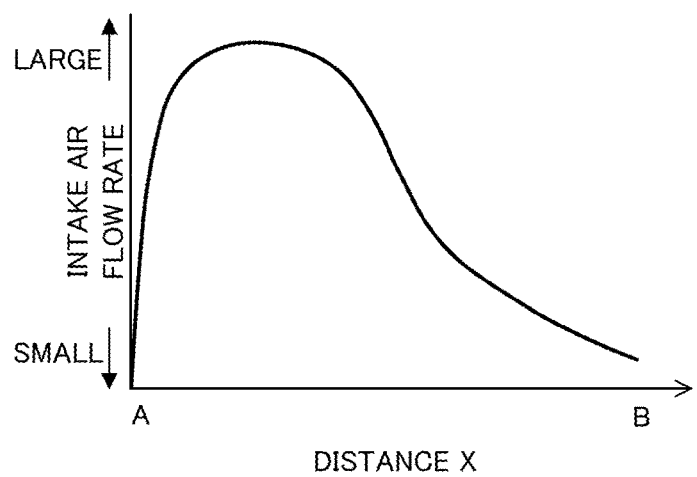
FIG. 10 illustrates the intake air flow rate characteristics of an alternative embodiment.
Figure 11:
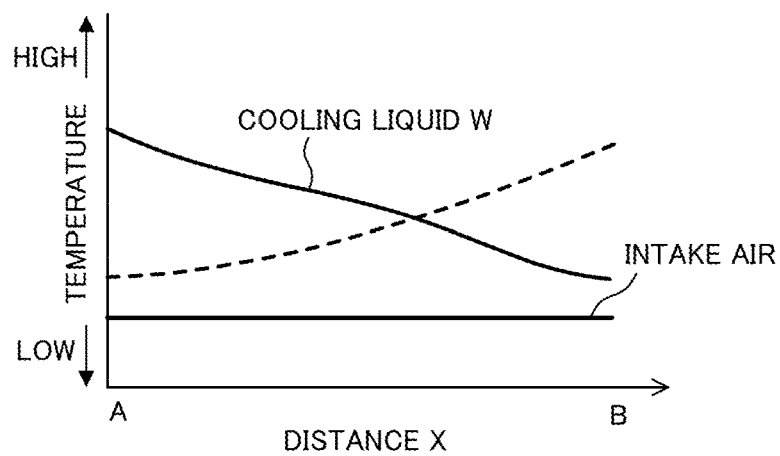
FIG. 11 illustrates the temperature characteristics of the alternative embodiment.

As shown in FIG. 10, the characteristics of the intake air flow rate are the same as those shown in FIG. 5. As shown in FIG. 11, the temperature of the cooling liquid W is higher than the temperature of the intake air, and thus a temperature gradient is formed, exhibiting a trend in which the temperature of the cooling liquid W gradually decreases from the point A side toward the point B side. In other words, in this case as well, a large temperature difference can be secured between the cooling liquid W and the intake air on the point A side. In the case of the comparative example, the cooling liquid W is introduced into the heat exchange part 1A from the point B side, and thus a temperature gradient is formed, exhibiting a trend in which the temperature of the cooling liquid W gradually decreases from the point B side toward the point A side.

Figure 12:
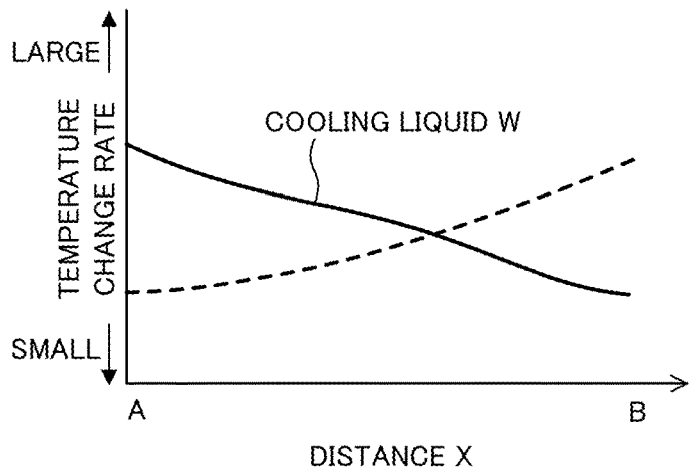
FIG. 12 illustrates the temperature change rate characteristics of the alternative embodiment.

As shown in FIG. 12, the temperature change rate of the cooling liquid W decreases from the point A side toward the point B side. In other words, in this case as well, the heat exchange of the cooling liquid W is more accelerated on the point A side. In the case of the comparative example, the heat exchange of the cooling liquid W is more accelerated on the point B side where the intake air flow rate is low. As a result, as shown in FIG. 13, in the case of heating the intake air, the heat exchange efficiency is also higher than in the comparative example from the center of the distance X to the point A. Further, as shown in FIG. 14, the total heat reception amount of the intake air in the heat exchange part 1A is greater than in the comparative example.

In this way, even when the intake air cooling device 100A is used to heat the intake air, a large temperature difference between the intake air and the cooling liquid W can be created in the area where the intake air flow rate is high. As a result, in this case, the heat of the intake air can be efficiently exchanged so as to heat the intake air.

Second Embodiment

Figure 15:
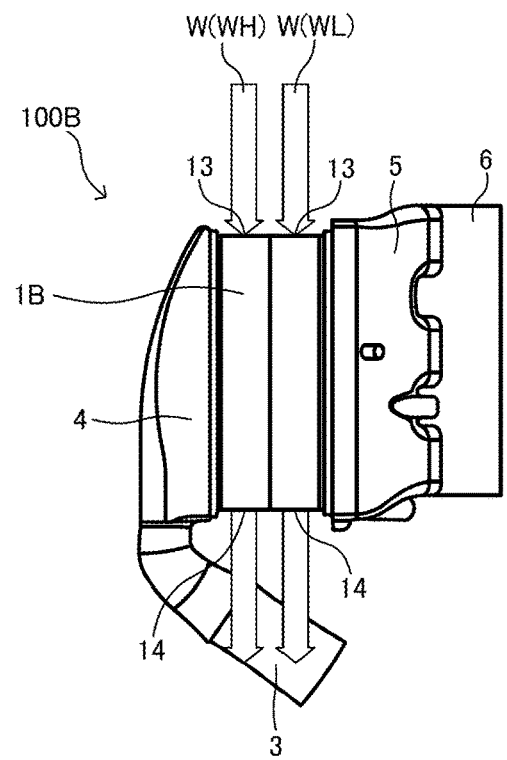
FIG. 15 illustrates an intake air cooling device of an internal combustion engine of a second embodiment.

FIG. 15 illustrates an intake air cooling device 100B of a second embodiment. The intake air cooling device 100B is configured in the same manner as the intake air cooling device 100A, except that the intake air cooling device 100B includes a heat exchange part 1B instead of the heat exchange part 1A. The heat exchange part 1B is incorporated into the cooling liquid circuits of two systems, and is configured to perform heat exchange between the intake air and each cooling liquid W which flows through the cooling liquid circuits of the two systems.

In the heat exchange part 1B configured in this way, each of the two systems is provided with a cooling liquid introduction port 13 and a cooling liquid outlet 14, and a built-in heat exchanger 11 is also provided to serve both of the two systems. In other words, in the present embodiment, the heat exchanger 11 is constituted by heat exchangers for the two systems. The heat exchangers for the two systems may be constituted by two individual heat exchangers, or may be constituted by integrating two heat exchangers. In the present embodiment, the heat exchangers for the two systems are provided adjacent to each other in the direction orthogonal to the lengthwise direction (the direction connecting the collector 4 and the intake manifold 5).

The cooling liquid circuits of the two systems are constituted by a high-temperature cooling liquid circuit through which a high-temperature cooling liquid WH flows as the cooling liquid W, and a low-temperature cooling liquid circuit through which a low-temperature cooling liquid WL flows as the cooling liquid W. The high-temperature cooling liquid circuit includes a heat source, and is configured such that the high-temperature cooling liquid WH receives heat from the heat source and radiates this heat in the heat exchange part 1B. The low-temperature cooling liquid circuit is configured such that the low-temperature cooling liquid WL receives heat in the heat exchange part 1B, and this heat is radiated by means of a heat radiation part such as a radiator. The high-temperature cooling liquid circuit is provided in the heat exchange part 1B on the side of the collector 4, among the collector 4 and the intake manifold 5, and the low-temperature cooling liquid circuit is provided on the opposite side. The arrangement of the high-temperature cooling liquid circuit and the low-temperature cooling liquid circuit in the heat exchange part 1B may be reversed.

Next, the main operational effects of the present embodiment shall be explained.

In the intake air cooling device 100B, the heat exchange part 1B performs heat exchange between the intake air and each cooling liquid W which flows through the cooling liquid circuits of the two systems, i.e. the high-temperature cooling liquid WH and the low-temperature cooling liquid WL.

Due to this configuration, heat exchange can be efficiently performed between the intake air and each cooling liquid W which flows through the cooling liquid circuits of the two systems. In other words, in this configuration as well, a large temperature difference between the intake air and the cooling liquid W can be created in the area where the intake air flow rate is high, and the heat of the intake air can be efficiently exchanged.

In the intake air cooling device 100B, the heat exchange part 1B heats the intake air in the case where the temperature of the high-temperature cooling liquid WH in the high-temperature cooling liquid circuit is higher than the intake air temperature.

According to this configuration, the intake air can be efficiently heated in the high-temperature cooling liquid circuit, which is the cooling liquid circuit of one system among the cooling liquid circuits of the two systems.

Third Embodiment

Figure 16:
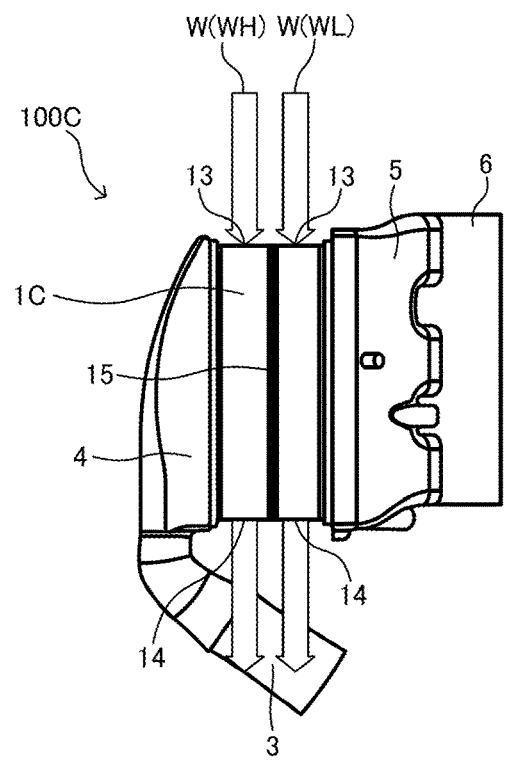
FIG. 16 illustrates an intake air cooling device of an internal combustion engine of a third embodiment.

FIG. 16 illustrates an intake air cooling device 100C of a third embodiment. The intake air cooling device 100C is configured in the same manner as the intake air cooling device 100B, except that the intake air cooling device 100C includes a heat exchange part 1C instead of the heat exchange part 1B. The heat exchange part 1C is configured in the same manner as the heat exchange part 1B except that the heat exchange part 1C further includes a heat insulating layer 15.

The heat insulating layer 15 is provided between a high cooling liquid circuit and a low cooling liquid circuit of the heat exchange part 1C, i.e. between the two heat exchangers that constitute the heat exchangers for the two systems. The heat insulating layer 15 has a structure which allows the intake air to pass therethrough (for example, a slit-type porous structure or a mesh structure), and blocks direct contact between the high-temperature cooling liquid circuit and the low-temperature cooling liquid circuit in the heat exchange part 1C. For the heat insulating layer 15, for example, a resin having a higher heat insulating property than the material of the heat exchanger, or a heat insulating material such as a metal can be used. The heat insulating layer 15 may be constituted by a passage space of the heat exchange part 1C that is formed between the high-temperature cooling liquid circuit and the low-temperature cooling liquid circuit in the heat exchange part 1C. In other words, the heat insulating layer 15 may be constituted by arranging the high-temperature cooling liquid circuit and the low-temperature cooling liquid circuit of the heat exchange part 1C so as to be spaced apart from each other.

Next, the main operational effects of the present embodiment shall be explained.

In the intake air cooling device 100C, the heat exchange part 1C includes the heat insulating layer 15 between the high-temperature cooling liquid circuit and the low-temperature cooling liquid circuit.

Due to this configuration, the movement of heat between the high-temperature cooling liquid circuit and the low-temperature cooling liquid circuit can be suppressed by the heat insulating layer 15. Therefore, changes in the temperature of the cooling liquid W in each cooling liquid circuit due to the movement of heat can be suppressed, and accordingly a large temperature difference between the intake air and the cooling liquid W can be secured in the area where the intake air flow rate is high. As a result, the heat of the intake air can be more efficiently exchanged in each cooling liquid circuit.

Embodiments of the present invention have been explained above, but these embodiments merely indicate some application examples of the present invention, and the technical scope of the present invention is not meant to be limited to the specific configurations of the embodiments described above.

The invention claimed is:

1. A heat exchange device for performing heat exchange of intake air of an internal combustion engine, the heat exchange device comprising:
   a heat exchange part configured to exchange heat between a heat medium introduced into the heat exchange part and intake air passing through the heat exchange part, the heat exchange part comprising a heat medium introduction port;

an intake air control valve configured to perform control of the intake air passing through the heat exchange part;

an air intake pipe in which the intake air control valve is located; and a collector part configured to temporarily store the intake air, wherein:

the heat exchange part and the collector part have a lengthwise direction in a direction in which cylinders are arranged in the internal combustion engine, the heat exchange part has a first end side and a second end side in the lengthwise direction, the collector part is located downstream of the air intake pipe and upstream of the heat exchange part in a direction of intake air flow, the collector part extends across an entirety of the heat exchange part in the lengthwise direction, the heat medium introduction port is located on the first end side in the lengthwise direction of the heat exchange part, the air intake pipe causes the intake air that has passed through the intake air control valve to drift in the collector part in a region from a center toward the first end side in the lengthwise direction of the heat exchange part due to curvature of the air intake pipe, the heat medium introduction port and the intake air control valve are located at positions opposite each other with respect to the heat exchange part, the intake air control valve is configured to cause the intake air to flow into the collector part at the second end side in the lengthwise direction of the heat exchange part.

2. The heat exchange device according to claim 1, wherein the heat medium introduction port and a heat medium outlet of the heat exchange part are located at positions opposite each other with respect to the heat exchange part.

3. The heat exchange device according to claim 1, wherein the heat exchange part is configured to perform heat exchange between the intake air and each heat medium flowing through heat medium circuits of two systems.

4. The heat exchange device according to claim 3, wherein the heat medium circuit of one system, among the heat medium circuits of the two systems, is configured to comprise a heat source, and the heat exchange part is configured to heat the intake air in a case where a temperature of the heat medium in the heat medium circuit of the one system is higher than a temperature of the intake air.

5. The heat exchange device according to claim 3, wherein the heat exchange part includes a heat insulating layer between the heat medium circuits of the two systems.

6. The heat exchange device according to claim 1, wherein the collector part is disposed in a portion on an upstream side of the heat exchange part.

7. The heat exchange device according to claim 1, wherein the collector part is integral with the heat exchange part.

8. The heat exchange device according to claim 1, wherein the air intake pipe is connected to the collector part at an orientation opposite to a direction in which the heat medium is introduced from the heat medium introduction port.

* * * * *